US012612735B2

(12) United States Patent (10) Patent No.: US 12,612,735 B2
Maier et al. (45) Date of Patent: Apr. 28, 2026

(54) AQUEOUS DISPERSION FOR IMPROVING BARRIER PROPERTIES

(71) Applicant: ACTEGA DS GMBH, Bremen (DE)

(72) Inventors: Anna Maier, Bonn (DE); Jane Oeljeschläger, Bremen (DE)

(73) Assignee: ACTEGA DS GMBH, Bremen (DE)

( * ) Notice: Subject to any disclaimer, the term of this patent is extended or adjusted under 35 U.S.C. 154(b) by 263 days.

(21) Appl. No.: 18/036,961

(22) PCT Filed: Nov. 24, 2021

(86) PCT No.: PCT/EP2021/082767
§ 371 (c)(1),
(2) Date: May 15, 2023

(87) PCT Pub. No.: WO2022/122381
PCT Pub. Date: Jun. 16, 2022

(65) Prior Publication Data
US 2023/0416991 A1 Dec. 28, 2023

(30) Foreign Application Priority Data
Dec. 10, 2020 (EP) ..................................... 20212993

(51) Int. Cl.
| | |
|---|---|
| *D21H 19/58* | (2006.01) |
| *C09D 5/02* | (2006.01) |
| *C09D 7/62* | (2018.01) |
| *C09D 123/08* | (2006.01) |
| *D21H 19/40* | (2006.01) |
| *D21H 21/18* | (2006.01) |

(52) U.S. Cl.
CPC ............. *D21H 19/58* (2013.01); *C09D 5/022* (2013.01); *C09D 7/62* (2018.01); *C09D 123/0869* (2013.01); *D21H 19/40* (2013.01); *D21H 21/18* (2013.01)

(58) Field of Classification Search
CPC ........ D21H 19/58; D21H 19/40; D21H 21/18; D21H 17/375; D21H 17/72; D21H 19/20; D21H 27/10; D21H 17/37; C09D 5/022; C09D 7/62; C09D 123/0869; C09D 11/107; C08L 2205/025; C08L 2205/03; C08L 23/0869; C08L 23/0815; C08L 23/16; C08K 3/34
See application file for complete search history.

(56) References Cited

U.S. PATENT DOCUMENTS

| | | | | |
|---|---|---|---|---|
| 3,373,223 | A | * | 3/1968 | Armstrong .............. C08L 23/10 |
| | | | | 525/183 |
| 3,553,178 | A | | 1/1971 | Clampitt |
| 3,644,258 | A | | 2/1972 | Moore |
| 3,674,896 | A | | 7/1972 | Purcell |
| 3,823,108 | A | | 7/1974 | Bissot |
| 3,872,039 | A | | 3/1975 | Vaughn |
| 3,899,389 | A | | 8/1975 | Vaughn |
| 3,970,626 | A | | 7/1976 | Hurst |
| 3,983,268 | A | | 9/1976 | Scharf |
| 4,400,440 | A | | 8/1983 | Shaw |
| 4,540,736 | A | | 9/1985 | Herten |
| 5,550,177 | A | | 8/1996 | Fanta |
| 5,591,806 | A | | 1/1997 | Recchia |
| 6,767,956 | B2 | | 7/2004 | Choudhery |
| 6,852,791 | B2 | | 2/2005 | Kawaguchi |
| 6,852,792 | B1 | | 2/2005 | Capendale |
| 7,528,080 | B2 | | 5/2009 | Prieto |
| 8,173,209 | B2 | | 5/2012 | Chereau |
| 10,072,143 | B2 | * | 9/2018 | Ohfuji ...................... C08L 75/04 |
| 2005/0100754 | A1 | * | 5/2005 | Moncla ................... C08J 7/0427 |
| | | | | 524/522 |
| 2005/0192365 | A1 | * | 9/2005 | Strandburg ................ C08J 9/30 |
| | | | | 521/50 |
| 2005/0271888 | A1 | | 12/2005 | Moncla |
| 2007/0121933 | A1 | | 5/2007 | Futa |
| 2007/0137811 | A1 | | 6/2007 | Runge |
| 2007/0141933 | A1 | | 6/2007 | Wevers |

(Continued)

FOREIGN PATENT DOCUMENTS

| | | | | |
|---|---|---|---|---|
| CA | 1332770 | C | * 10/1994 | ................ C08F 4/34 |
| EP | 1941993 | | 7/2008 | |

(Continued)

OTHER PUBLICATIONS

International Search Report and Written Opinion for International Application No. PCT/EP2021/082767 dated Feb. 16, 2022.
Third Party Observation for Application No. EP20190711123 dated Sep. 15, 2021, 4 pages.

(Continued)

*Primary Examiner* — Jose A Fortuna

(57) ABSTRACT

A fiber preparation treated with an aqueous polyolefin dispersion having a pH value from 7.5-9.4 containing from 50 to 100 wt. % of an aqueous dispersion A and from 0 to 50 wt. % of a compound B. Dispersion A comprises from 41 to 98 wt. % of A1, one or more copolymers of ethylene and (meth)acrylic acid having a content of (meth)acrylic based groups of at least 14 wt. % based on the total weight of the copolymer, from 1 to 59 wt. % of A2, one or more olefinic structure units containing hydrocarbon polymer, and from 0-35 wt. % of additive different from A1 and A2, based on the solid content of dispersion A. Compound B is a material dispersible or soluble in water and different from the ingredients of dispersion A. The wt. % of A and B is based on the solid content of the aqueous polyolefin dispersion.

12 Claims, No Drawings

(56) References Cited

U.S. PATENT DOCUMENTS

| | | | |
|---|---|---|---|
| 2007/0292705 A1 | 12/2007 | Moncla | |
| 2008/0009586 A1 | 1/2008 | Vansumeren | |
| 2008/0057205 A1 | 3/2008 | Lohden et al. | |
| 2008/0176968 A1* | 7/2008 | VanSumeren | C08J 9/0061 |
| | | | 521/97 |
| 2008/0214714 A1 | 9/2008 | Hoshikawa | |
| 2008/0295985 A1 | 12/2008 | Moncla | |
| 2010/0227520 A1 | 9/2010 | Claasen | |
| 2010/0255207 A1 | 10/2010 | Neubauer et al. | |
| 2012/0040921 A1 | 2/2012 | Setchell | |
| 2012/0125801 A1 | 5/2012 | Kainz | |
| 2012/0183705 A1 | 7/2012 | Chereau | |
| 2013/0030086 A1 | 1/2013 | Baumann | |
| 2013/0101847 A1 | 4/2013 | Neubauer | |
| 2014/0058034 A1 | 2/2014 | Moncla | |
| 2014/0243457 A1 | 8/2014 | Koehler | |
| 2014/0255683 A1 | 9/2014 | Amici | |
| 2015/0344718 A1 | 12/2015 | Lundgard et al. | |
| 2015/0368521 A1 | 12/2015 | Einsla et al. | |
| 2016/0177075 A1 | 6/2016 | Crimmins | |
| 2016/0280897 A1 | 9/2016 | Tavarez | |
| 2016/0280901 A1* | 9/2016 | Ohfuji | C09J 123/26 |
| 2016/0280951 A1 | 9/2016 | Drumright | |
| 2018/0363248 A1 | 12/2018 | Katzenstein | |
| 2021/0009766 A1 | 1/2021 | Maier et al. | |
| 2021/0347997 A1 | 11/2021 | Walia | |
| 2022/0315788 A1 | 10/2022 | Maier et al. | |
| 2023/0416991 A1* | 12/2023 | Maier | C08L 23/0869 |
| 2025/0051601 A1* | 2/2025 | Maier | C08L 23/0869 |

FOREIGN PATENT DOCUMENTS

| | | | |
|---|---|---|---|
| EP | 2307132 | 4/2011 | |
| EP | 2433772 | 3/2012 | |
| EP | 2551298 | 1/2013 | |
| EP | 2739681 B1 * | 5/2017 | B32B 27/08 |
| EP | 3578601 | 12/2019 | |
| EP | 4259880 B1 * | 10/2024 | D21H 21/18 |
| ES | 2994981 T3 * | 2/2025 | D21H 21/18 |
| TW | I329119 B * | 8/2010 | C08L 53/00 |
| WO | 0164774 | 9/2001 | |
| WO | 2005021638 | 3/2005 | |
| WO | WO-2005021622 A3 * | 3/2005 | C08J 9/00 |
| WO | WO-2005021638 A3 * | 3/2005 | C08L 23/00 |
| WO | 2005085331 | 9/2005 | |
| WO | 2007008633 | 1/2007 | |
| WO | 2008051756 | 5/2008 | |
| WO | 2008052122 | 5/2008 | |
| WO | 2008068658 | 6/2008 | |
| WO | 2009035877 | 3/2009 | |
| WO | 2009055275 | 4/2009 | |
| WO | 2009064993 | 5/2009 | |
| WO | 2012040921 | 4/2012 | |
| WO | 2013058402 | 4/2013 | |
| WO | 2013191826 | 12/2013 | |
| WO | 2014093043 | 6/2014 | |
| WO | 2014105464 | 7/2014 | |
| WO | 2019180118 | 9/2019 | |
| WO | 2021047874 | 3/2021 | |
| WO | 200164774 | 9/2021 | |
| WO | 2022122379 | 6/2022 | |
| WO | WO-2022122381 A1 * | 6/2022 | D21H 17/37 |

OTHER PUBLICATIONS

Third Party Observation for Application No. EP20190711123 dated Sep. 16, 2021, 3 pages.

* cited by examiner

AQUEOUS DISPERSION FOR IMPROVING BARRIER PROPERTIES

The present invention relates to a fiber preparation, a product based on said fibre preparation and the use of an aqueous dispersion.

By mechanically dispersing of polyolefins in water, so called secondary aqueous polyolefin dispersions can be obtained. These dispersions when applied to various substrates offer the special characteristics of polyolefins, including water/chemical resistance. Via mechanical dispersion technology water-borne dispersions of polymers are available. In general, secondary polymer dispersions in a carrier liquid can be prepared by high shear mixing of the polymer in the carrier liquid at a temperature that is above the melting temperature of the polymer. According to US 2014/0255683 aqueous polyolefin dispersions which are suitable as coating compositions are available by a melt kneading method in which special thermoplastic and acid polyolefins are processed Grease-resistance, water resistance and water vapor resistance are barrier properties which are deemed as to be typical key properties of coated paper and coated carton board (both normally essentially containing plant fibers) that can be improved with the right choice of coating. Polyolefins are widely used for paper coating but are typically applied as a thermoplastic melt using extrusion coating techniques. The availability of water-based polyolefin dispersions provides an economically attractive alternative. The polyolefin dispersion can be applied to paper using conventional processes for water-based coatings, including various spraying techniques. In addition, the dispersion can be printed onto a paper web, such as by gravure printing, roll coating, etc.

U.S. Pat. No. 7,528,080 proposes the use of a special aqueous polyolefin dispersion for the treatment of fibers so that corresponding treated textile articles are available having attractive impregnating properties.

However, the above-mentioned technology does not provide suitable polyolefin dispersions for paper applications revealing satisfying barrier properties. The problem addressed by the present invention is therefore that of providing a suitable aqueous polyolefin dispersion for paper and carton treatment. Said treatment with the aqueous polyolefin dispersion should permit the manufacturing of high-quality paper/carton articles, having beneficial characteristics in connection with grease-resistance, water resistance and/or water vapor resistance.

The solution to this problem is a fiber preparation treated with an aqueous polyolefin dispersion having a pH value from 7.5-9.4 containing
- a. from 50 to 100 wt. % of an aqueous dispersion A comprising the following ingredients:
  - i. from 41 to 98 wt. % of A1, a copolymer of ethylene and (meth)acrylic acid having a content of (meth) acrylic based groups of at least 14 wt. % based on the total weight of the copolymer or a mixture of different copolymers of ethylene and (meth)acrylic acid each having a content of (meth)acrylic based groups of at least 14 wt. % based on the total weight of the copolymer,
  - ii. from 1 to 59 wt. % of A2, another olefinic structure units containing hydrocarbon polymer, or a mixture of other olefinic structure units containing hydrocarbon polymers, and

- iii. from 0-35 wt. % of additive different from A1 and A2,
- b. from 0 to 50 wt. % of a compound B, where compound B is a material dispersible or soluble in water and different from any of the ingredients of dispersion A wherein
  - the wt. % of A and B is based on the solid content of the whole aqueous polyolefin dispersion,
  - the wt. % of the ingredients of dispersion A is based on the solid content of dispersion A,
  - the sum of the wt. % of ingredients i to iii of dispersion A is 100%.

By definition, the hydrocarbon copolymer only contains the elements carbon and hydrogen. The term "olefinic structure units" means structural units (of a polymer) which are generated by the polymerization of corresponding olefines. The olefinic structure units containing hydrocarbon polymer (and the corresponding mixture of it) might be provided by corresponding homopolymer and/or copolymer.

The fiber preparation treated with the aqueous polyolefin dispersion provides excellent barrier properties, especially grease-resistance, water resistance and water vapor resistance. The used dispersion has a high stability and is of good quality.

Aqueous Polymer Dispersion A

The aqueous polyolefin dispersion used according to the current invention comprises an aqueous polymer dispersion A having the following ingredients:
- i. from 41 to 98 wt. % of A1, a copolymer of ethylene and (meth)acrylic acid having a content of (meth)acrylic based groups of at least 14 wt. % based on the total weight of the copolymer or a mixture of different copolymers of ethylene and (meth)acrylic acid each having a content of (meth)acrylic based groups of at least 14 wt. % based on the total weight of the copolymer,
- ii. from 1 to 59 wt. % of A2, another olefinic structure units containing hydrocarbon polymer, or a mixture of other olefinic structure units containing hydrocarbon polymers, and
- iii. from 0-35 wt. % of additive different from A1 and A2, wherein the wt. % of the ingredients of dispersion A is based on the solid content of dispersion A, and the sum of the wt. % of ingredients i to iii of dispersion A is 100%.

According to a beneficial embodiment of the present invention the aqueous polyolefin dispersion used according to the current invention comprises an aqueous dispersion A having the following ingredients:
- i. from 51 to 95 wt. % of A1, a copolymer of ethylene and (meth)acrylic acid having a content of (meth)acrylic based groups of at least 14 wt. % based on the total weight of the copolymer or a mixture of different copolymers of ethylene and (meth)acrylic acid each having a content of (meth)acrylic based groups of at least 14 wt. % based on the total weight of the copolymer,
- ii. from 5 to 49 wt. % of A2, another olefinic structure units containing hydrocarbon polymer, or a mixture of other olefinic structure units containing hydrocarbon polymers, and
- iii. from 0-35 wt. % of additive different from A1 and A2, the wt. % of the ingredients of dispersion A is based on the solid content of dispersion A, and the sum of the wt. % of ingredients i to iii of dispersion A is 100%.

Said copolymer of ethylene and (meth)acrylic acid A1 is preferably provided by a copolymer of ethylene and (meth) acrylic acid which has sufficient properties in connection with melt processability, which is for example a copolymer having a Melt Flow Index (MFI) of between 2 to 3000 g/10 min, as measured at 190° C. at a load of 2.16 kg.

According to a special embodiment at least 60 wt. % of A1 have a content of (meth)acrylic based groups of at least 19 wt. % based on the total weight of the copolymer.

The used aqueous dispersions have a high dispersion stability (may be also because the relative high amount of A1) which is beneficial for the relevant paper/carton application.

Examples of suitable commercially available copolymers of polyethylene and (meth)acrylic acid A1 that can be used in the dispersion according to the present invention include Primacor™ 5980 (ex. SK-Chemicals), Nucrel™ 925, Nucrel™ 960 (ex. Dow) and Escor™ 5200 (ex. Exxonmobil).

The other copolymer containing olefinic structure units A2 that is present in polymer dispersion A might be selected based upon the special (paper) application of the used aqueous dispersion. The relevant olefinic structure units are based on polymerized olefin monomers, normally selected from alkenes and/or polyenes.

Preferably, at least 60 wt. % of A2 are provided by copolymers containing ethylene structural units (structural units which are generated by the polymerisation of ethylene).

According to a special embodiment at least 60 wt. % of A2 is selected from the group consisting of polyolefins with ethylene and 1-octene structural units and polyolefins with ethylene and propylene structural units.

Examples of suitable commercially available other polymers A2 that can be used in polymer dispersion A according to the present invention include: Dutral CO 034 and Dutral CO 038, ethylene propylene copolymer (28 wt % propylene), "Versalis"; Vistamaxx 6202 elastomer with an ethylene content of 15 wt %, "Exxonmobil"; Engage 8407, propylene-based olefinic ethylene-octene copolymer, "Dow".

The additive that can be present in the aqueous dispersion according to the present invention includes dispersing agents, rheology additives, adhesion promotors, tackifiers, defoamers, fillers, pigments and any other material that is known for use in polymer dispersions or polymer compositions. Examples of typical additives that can be used in the aqueous dispersion according to the present invention include stearic acid, oleic acid and other long chain carboxylic acids, clays, synthetic silicates, silica, waxes, such as paraffin wax and polyolefin wax, and dioctyl sodium sulfosuccinate.

Compound B is optionally present in the aqueous dispersion according to the present invention. Compound B is a material that is dispersable or soluble in water or a mixture of materials that are dispersable or soluble in water and different from any of the ingredients of dispersion A. For example, compound B can be added to improve the ability to recycle materials comprising the aqueous dispersion according to the present invention or materials or articles that are formed by evaporating water from this dispersion. Compound B can be an inorganic material or an organic material. For example, Compound B might be a polymer not having olefinic structural units (like a polyether) or a mixture of polymers, dispersible or soluble in water.

Thus, in a special embodiment of the present invention compound B is present and might comprise a recycling auxiliary component. The recycling auxiliary component is typically provided by polyvinyl pyrrolidone (PVP) (Mw 5000-200000) and/or polyethylene glycol (PEG) (Mw 1000-

100000). According to one embodiment the aqueous polyolefin dispersion contains (as an ingredient of B) less than 5 wt. %, preferably less than 4 wt. % of PEG, based on the solid content of the whole aqueous dispersion.

Typically, the (whole) aqueous polyolefin dispersion has a solid content of 10-60 wt. %.

Preparation of the Aqueous Polymer Dispersion:

The process for the preparation of the applied aqueous polyolefin dispersion typically contains the steps a. to c. wherein a. in a first step all solid components of dispersion A are intimately mixed at a temperature in the range of 50° C. to 200° C. after which a homogenous compound of all components is obtained, b. in a next step the homogeneous compound is mixed with water, compound B, and a neutralizing agent to adjust the pH value at a temperature which is 2 to 20° C. above the highest melting temperature of the components mixed in the first step until an aqueous dispersion is obtained and c. the aqueous dispersion received in step b. is cooled down below a temperature which is below the melting temperature or the melting range (in case there is no uniform melting temperature of the A1 components) of A1.

Typically, the mixing in the first step is performed in a twin-screw extruder. Normally, the mixing of the homogeneous compound with water, compound B (if contained) and the neutralizing compound is performed under elevated pressure. The "premixing step" a. allows the preparation of an aqueous dispersion without the use of (additional) emulsifiers. It is advantageous to avoid these emulsifiers in the dispersion because of food safety reasons and properties in connection with heat sealability. The mixing of the homogeneous compound with water, compound B and the neutralizing compound might be performed at a pressure which is higher than the vapour pressure of water at the mixing temperature.

The cooling step c. is important in order to receive a product having attractive barrier properties. Normally, the aqueous dispersion is cooled below 50° C., preferably below 30° C. Advantageously, the cooling of the aqueous dispersion is performed very quickly (normally at least 10° C. per minute, preferably at least 50° C. per minute) which additionally improves the heat sealability properties.

In the process for the preparation of the aqueous polyolefin dispersion according to the present invention the homogenized compound obtained in the first step is mixed with water, compound B (if contained), and a neutralizing agent at a temperature which is 2 to 20° C. above the highest melting temperature of the components mixed in the first step until an aqueous dispersion is obtained wherein often all dispersed particles have a particle size below 60 μm, preferably below 20 μm. A temperature which is 2 to 20° C. above the highest melting temperature of the components mixed in the first step means a temperatures which is 2 to 20° C. above the highest melting temperature of any of the individual components that are mixed to obtain the homogenized compound. For example, if the homogenized compound is obtained by 3 ingredients, A1, A2 and A3, each having their own melting temperature ($T_{MA1}$, $T_{MA2}$, $T_{MA3}$), where $T_{MA2}>T_{MA1}>T_{MA3}$, 2 to 20° C. above the highest melting temperature means 2 to 20° C. above $T_{MA2}$. The neutralizing agent that is used in the process for the preparation of the aqueous polyolefin dispersion according to the present invention can be any basic aqueous solution, for example an aqueous solution of $NH_3$. The relevant aqueous polyolefin dispersion should receive a pH value of 7.5-9.4.

The size of the particles that are present in the aqueous polyolefin dispersion used according to the present invention are often <60 µm. This particle size can be measured by using a Microtrac S3500 laser diffraction system, using the wet dispersion module. For each measurement, 1 ml of a dispersion was added to the 1 l dispersing unit of the wet dispersion module, where the dispersing module was filled with water with a pH in the range of 7-10.

The liquid content of the aqueous polyolefin dispersion according to the present invention is variable and normally according to conventional polyolefin dispersions. Typically, as dispersion liquid water is used exclusively.

The used aqueous dispersion contains ingredients that are approved as indirect food additives, i.e. substances that may come into contact with food as part of packaging or processing equipment but are not intended to be added directly to food. The ingredients are sometimes referred to as food safe materials or material suited for direct food contact. In this connection, "food safe" means that these materials satisfy the criteria of the European Union directive "EU 10-2011 for plastics intended to come into contact with food" and its amendments. In one embodiment of the present invention, all ingredients that are present in the aqueous polymer dispersion are food safe materials or material suited for direct food contact.

In general, the aqueous polyolefin dispersion used according to the present invention has the following properties:

Solid content 10-60 wt. %
Viscosity 10-10000 mPa*s
Storage stability ≥6 months
Average particle size from 0.1 to 50 µm The process according to the present invention provides a kind of premixing of (dry) components which is performed in the first step: All solid components of dispersion A, especially component A1 and A2 are intimately mixed at a temperature in the range of 50° C. to 200° C. after which a homogenous compound of all components is obtained. Typically, in the premixing step no water is used. Said premixing step seems to be the basis for the generation of hybrid particles containing both A1 and A2. In the next step the homogeneous compound provided in the premixing step is further mixed with water, optionally with compound B, and a neutralizing agent: The result is an aqueous polyolefin dispersion comprising dispersed hybrid particles containing both A1 and A2.

In order to provide experimental information regarding the composition of the dispersion as analytical methods especially Differential Scanning Calorimetry (DSC) and/or IR spectroscopy might be used. According to the said DSC method the melting temperatures (melting ranges) were determined on the one hand for the used raw materials (polymers) and on the other hand for the produced compounds (solid content of the dispersion). The melting ranges of the produced compounds were generally much broader than of the used raw materials indicating mixing quality.

DEFINITIONS

Within the content of this description the following definitions are used (meth)acrylic means acrylic and/or methacrylic;

A homogeneous polymer containing compound is a compound that shows no optical defects when cast into a film with a thickness in the range of 1 to 2 mm.

Measurement Methods

The following measurement methods were used to characterize the individual components and the obtained products mentioned in this description:

Melt Flow Index (MFI) was determined in accordance with ISO 1133 in a Zwick/Roell extrusion plastometer. The MFI is measured at 190° C. at a load of 2.16 kg. For each measurement, 6 gr of material was heated for 5 minutes inside the measurement cylinder prior to the start of a measurement. The MFI is the average value for three portions.

The melting temperature of a component was determined using differential scanning calorimetry according to ISO 11357. For the measurement a Mettler Toledo DSC Star System was used. The measurements were carried out under nitrogen in a temperature range of –60 to 200° C. and a heating rate of 10 K/min.

The solid content of a dispersion was determined in a Moisture Analyzer HC103 from Mettler-Toledo GmbH. The measurements are done at 130° C. for 30 minutes, then the weight is constant.

The viscosity of a dispersion was measured using a Thermo Fisher Scientific HAAKE™ Rotation Rheometer RV1 at 20° C. using a double-cone DC60/2 Ti L configuration in combination with a MPC/DC60 geometry. The measurements were performed during 120 s at shear rates between 0 and 120 $s^{-1}$. The viscosity values at shear rate 114 $s^{-1}$ are evaluated.

The particle size was measured using a Microtrac S3500 laser diffraction system, using a wet dispersion module. For each measurement, 1 ml of a dispersion was added to the 1 l dispersing module, where the dispersing module was filled with water with a pH in the range of 7-10. The further settings are cell size 2 mm, ultra sound duration 60 s. The specific value is ×50-value in µm, which corresponds to the average particle size.

The pH value was determined by a pH meter PCE-228 of PCE Instruments accorded to DIN ISO 8975 of the undiluted dispersion.

The preparation of the samples for the different barrier tests contains several steps: The dispersion is applied to the substrate with a wire bar and then it is dried at 120° C. for 120 seconds in an oven.

The coating weight of the of the applied dispersion layer was determined gravimetrically. For this purpose, circles with a defined area are cut out from the uncoated substrate using circular cutter and weighed with an analytical balance. Then circles with the same area are cut out from the coated substrate and weighted, too. The difference is standardized and describes the load quantity in grams per square meter.

The water vapour permeability is measured accorded to ISO 15106-2 and ASTM F1249 with the C390H Water Vapor Transmission Rate Test System from Labthink®. The measurements were done at two different conditions (23° C. and 50% rh and 38° C. and 90% rh). The coated side of the substrates was faced to the water vapor side of the measuring device.

The water absorption/resistance was measured using a COBB Tester accorded to DIN EN ISO 535 ("Paper and board—Determination of water absorptiveness"). For this purpose, the sample is cut out and weighted with an analytical balance. Afterwards, the sample is exposed to water in the COBB tester for a certain time and then couched between two blotting papers to remove the excess water from the sample surface. Then the "wet" sample is weighted, too and the difference is standardized and describes the water absorption in grams per square meter. The time can vary between 60 seconds (COBB 60) and 1800 seconds (COBB 1800).

The oil/grease resistance was also determined using the COBB tester in accordance with test procedures of DIN EN ISO 535. The sample is cut out and weighted with an analytical balance. Afterwards, the sample is exposed to oil in the COBB tester for a certain time and then couched between two blotting papers to remove the excess oil from the sample surface. Then the "oily" sample is weighted, too and the difference is standardized and describes the oil absorption in grams per square meter.

According to a preferred embodiment the fiber preparation according to the present invention forms a solid article, which is preferably provided by sheet. Typically, at least 80 wt. % of the fibers are provided by cellulose fibers so that the fiber preparation is provided by a paper or a carton article.

The relevant fibers might be selected from cellulose and lignocellulose fibers and combinations thereof which are obtainable from annual or perennial plants, in particular from wood.

Also, synthetic fibers, especially thermoplastic synthetic fibers might be used—e.g. on the basis of: glycolic acid polymer, polyolefin, polyethylene terephthalate, polyester, polyamide, polylactide, polyvinyl alcohol or polybutylene succinate. Additionally, reinforcement fibers might be used, e.g. selected from polymer fibers, mineral fibers, non-wood natural fibers and glass-fibers and combinations thereof. The fibers might be biodegradable and/or recyclable.

The corresponding fiber made products might be carrier bags and sacks, shopping bags, refuse sacks, wrappings of goods, industrial packages, medical packages, coverts, envelopes and bags for replacing plastic bags.

The present invention also relates to a product on the basis of a fiber preparation as described above, wherein the treating with the aqueous polyolefin dispersion is performed by applying the aqueous polyolefin dispersion as a binder and/or as a coating of fibers and thereafter the water of the aqueous polyolefin dispersion is removed.

Typically, the water of the aqueous polyolefin dispersion is removed by drying, preferably at temperatures above 75° C. The relevant (drying) temperature should be generally sufficient high in order to allow a film-building of the contained polymer. Said film-building might be important regarding barrier properties.

Said product is typically provided by paper or by carton. The treatment of the relevant paper substrate with the aqueous polymer dispersion might be performed by coating with a squeegee/wire bar, flexoroll or by spraying.

Additionally, the present invention provides the use of an aqueous polyolefin dispersion as described above as a binder and/or as a coating composition for a fiber based substrate, preferably for paper or carton.

The intention of said use is preferably to improve the barrier properties concerning grease-resistance, water-resistance and/or water-vapor-resistance.

Especially these barrier properties are important for the quality of paper packaging materials.

EXAMPLES

Various aqueous dispersions were prepared using the following procedure:

In a first step a compound was prepared by mixing and kneading the individual ingredients in a Leistritz ZSE 18 Maxx twin screw extruder at a temperature in the range of 80-150° C. (temperature was selected based on the ingredients), where different temperature zones were created inside the extruder. The pressure inside the extruder was 35 bar maximum.

In a next step the extruded compound was fed into a Büchi 2 1 Pressure reactor, equipped with a dissolver mixer operating at speeds between 100-1000 rpm. The dispersion was prepared at elevated temperature in the range of 90-150° C. at sometimes elevated pressure (additional pressure in the range of 0-100 bar). After the formation of a homogeneous dispersion the cooling of the mixture is essential. The cooling has to be performed as quickly as possible at crystallization temperature of the polymers until maximum temperature of 40° C.

The ingredients (in parts by weight, based on solid content) and conditions for each example are given in Table 1 below.

TABLE 1

| Example | 0* | 1 | 2 | 3 | 4 | 5* |
|---|---|---|---|---|---|---|
| EAA #3 | 100 | 60 | 60 | 60 | 60 | 100 |
| POE #8 | | 40 | | | | |
| POP #11 | | | 40 | | 20 | |
| EPM #82 | | | | 40 | 20 | |
| "Laponite" | | 1.65 | 3.3 | 3.3 | 4 | 4 |
| Solid content (%) | 28 | 30.5 | 31 | 31 | 26 | 26 |
| Base | NH₃ | NH₃ | NH₃ | NH₃ | NH₃ | NH₃ |
| pH value | 9.0 | 9.4 | 8.9 | 8.9 | 8.9 | 8.5 |
| Viscosity [mPa · s] | 104 | 144 | 512 | 540 | 200 | 817 |
| Water resistance Cobb-water 1800 [g/m²] | 11.8 | 1.64 | 3.71 | 8.5 | 5.99 | 11.0 |
| WVTR 23° C., 50% rh [g/m2*d] | 63 | 58 | 32 | 30 | 55 | 73 |
| WVTR 38° C., 90% rh [g/m2*d] | 480 | 422 | 209 | 224 | 217 | 304 |

EAA #3: dispersible polymer which is an ethylene acrylic acid copolymer (20 wt % acrylic acid),
POE #8: polyolefin plastomer containing Ethylen and 1-Octen,
POP #11: propylene-based elastomer with an ethylene content of 15 wt %,
EPM #82: ethylene propylene copolymer (28 wt % propylene),
Laponite: synthetic layered phosphate modified silicate with a specific surface area of 330 m²/g.

The invention claimed is:

1. Fiber preparation treated with an aqueous polyolefin dispersion having a pH value from 7.5-9.4, the aqueous polyolefin dispersion containing:
   a. from 50 to 100 wt. % of an aqueous dispersion A comprising the following ingredients:
      i. from 41 to 98 wt. % of A1, A1 being a copolymer of ethylene and (meth)acrylic acid having a content of (meth)acrylic based groups of at least 14 wt. % based on the total weight of the copolymer or a mixture of different copolymers of ethylene and (meth)acrylic acid each having a content of (meth)acrylic based groups of at least 14 wt. % based on the total weight of the copolymer,
      ii. from 1 to 59 wt. % of A2, A2 being a hydrocarbon polymer containing olefinic structure units, or a mixture of hydrocarbon polymers containing other olefinic structure units, and
      iii. from 0-35 wt. % of additive different from A1 and A2,
   b. from 0 to 50 wt. % of a compound B, where compound B is a material dispersible or soluble in water and different from any of the ingredients of dispersion A wherein
      the wt. % of A and B is based on the solid content of the whole aqueous polyolefin dispersion, the wt. % of the ingredients of dispersion A is based on the solid content of dispersion A, the sum of the wt. % of ingredients i to iii of dispersion A is 100%.

2. The fiber preparation according to claim 1 in which the aqueous dispersion A comprises the following ingredients:

i. from 51 to 95 wt. % of A1, ii. from 5 to 49 wt. % of A2, and iii from 0-35 wt. % of additive different from A1 and A2.

3. The fiber preparation according to claim 1, wherein at least 60 wt. % of A1 have a content of (meth)acrylic based groups of at least 19 wt. % based on the total weight of the copolymer.

4. The fiber preparation according to claim 1, wherein at least 60 wt. % of A2 are provided by copolymers containing ethylene structural units.

5. The fiber preparation according to claim 1, where at least 60 wt. % of A2 is selected from polyolefines with ethylene and 1-octene structural units and polyolefines with ethylene and propylene structural units.

6. The fiber preparation according to claim 1 wherein the aqueous polyolefin dispersion contains, as an ingredient of B, less than 5 wt. % of PEG, based on the solid content of the whole aqueous dispersion.

7. The fiber preparation according to claim 1 wherein the aqueous polyolefin dispersion contains dispersed hybrid particles containing A1 and A2.

8. The fiber preparation according to claim 1, wherein the whole aqueous polyolefin dispersion has a solid content of 10-60 wt. %.

9. A solid article formed from the fiber preparation according to claim 1.

10. The fiber preparation according to claim 1 in which at least 80 wt. % of the fibers are cellulose fibers of a paper or a carton article.

11. The fiber preparation according to claim 1 wherein the aqueous polyolefin dispersion contains, as an ingredient of B, less than 4 wt. % of PEG, based on the solid content of the whole aqueous dispersion.

12. A sheet formed from the fiber preparation according to claim 1.

* * * * *